(12) United States Patent  
Arnold

(10) Patent No.: US 7,073,412 B1
(45) Date of Patent: Jul. 11, 2006

(54) METHOD OF FORMING A PAWL POCKET FOR A RATCHETING TOOL AND TOOL THEREBY FORMED

(75) Inventor: Robert L. Arnold, Wrightsville, PA (US)

(73) Assignee: Easco Hand Tools, Inc., Simsbury, CT (US)

( * ) Notice: Subject to any disclaimer, the term of this patent is extended or adjusted under 35 U.S.C. 154(b) by 0 days.

(21) Appl. No.: 10/963,474

(22) Filed: Oct. 12, 2004

(51) Int. Cl.
  *B25B 13/46* (2006.01)
(52) U.S. Cl. ............................................ 81/63.2; 81/60
(58) Field of Classification Search ............ 81/60–63.2
  See application file for complete search history.

(56) References Cited

U.S. PATENT DOCUMENTS

| 893,097 | A | 7/1908 | Reams |
|---|---|---|---|
| 1,090,578 | A | 3/1914 | Smythe |
| 2,701,977 | A | 2/1955 | Stone |
| 2,957,377 | A | 10/1960 | Hare |
| 3,393,780 | A | 7/1968 | Kilness |
| 3,436,992 | A | 4/1969 | Over et al. |
| 3,606,940 | A | 9/1971 | Finkeldei |
| 3,783,703 | A | 1/1974 | Trimble et al. |
| 3,866,492 | A | 2/1975 | Knoll |
| 4,497,227 | A | 2/1985 | Stasiek |
| 4,520,697 | A | 6/1985 | Moetteli |
| 4,762,033 | A | 8/1988 | Chow |
| 4,924,737 | A | 5/1990 | Gummow |
| 5,448,931 | A | 9/1995 | Fossella et al. |
| 5,467,672 | A | 11/1995 | Ashby |
| 5,495,783 | A | 3/1996 | Slusar et al. |
| 5,501,124 | A | 3/1996 | Ashby |
| 5,884,537 | A | 3/1999 | Chen |
| 5,884,538 | A | 3/1999 | Van Lenten |
| 6,044,731 | A | 4/2000 | Hsieh |
| 6,065,374 | A | 5/2000 | Taggart |
| 6,134,990 | A | 10/2000 | Ling et al. |
| 6,151,993 | A | 11/2000 | Shiao |
| 6,155,140 | A | 12/2000 | Tsai |
| 6,161,454 | A | * | 12/2000 | Chaconas ............... 81/63.2 |
| 6,216,563 | B1 | 4/2001 | Hsieh |
| 6,230,591 | B1 | 5/2001 | Ling et al. |
| 6,282,992 | B1 | 9/2001 | Hu |
| 6,431,030 | B1 | 8/2002 | Kuo et al. |
| 6,435,063 | B1 | 8/2002 | Chen |
| 6,450,066 | B1 | 9/2002 | Hu |
| 6,450,068 | B1 | * | 9/2002 | Hu .......................... 81/63.2 |
| 6,457,387 | B1 | 10/2002 | Hu |
| 6,457,388 | B1 | 10/2002 | Chen |

(Continued)

OTHER PUBLICATIONS

U.S. Appl. No. 10/286,603, filed Nov. 1, 2002, Arnold et al.

(Continued)

*Primary Examiner*—David B. Thomas
(74) *Attorney, Agent, or Firm*—Nelson Mullins Riley & Scarborough, L.L.P.

(57) ABSTRACT

A method is provided for forming a pawl pocket in a ratcheting tool wherein a keyway cutter at the end of an elongated pin removes material from the neck portion of a wrench. When removing material from the tool's neck portion, a predetermined path of the keyway cutter defines two flat surfaces on respective opposing sides of the pawl pocket, with each flat surface forming an angle preferably in the range of about 27 to 35 degrees between a centerline of the pawl pocket and the flat surfaces themselves.

26 Claims, 13 Drawing Sheets

U.S. PATENT DOCUMENTS

| | | | |
|---|---|---|---|
| 6,520,051 B1 * | 2/2003 | Hu | 81/60 |
| 6,732,614 B1 | 5/2004 | Hu | |
| 6,758,641 B1 * | 7/2004 | Hu | 409/132 |
| 6,807,882 B1 * | 10/2004 | Hu | 81/60 |
| 6,945,141 B1 * | 9/2005 | Hu | 81/63.2 |
| 2001/0054531 A1 | 12/2001 | Chang | |
| 2002/0162423 A1 * | 11/2002 | Hu | 81/60 |
| 2002/0162424 A1 * | 11/2002 | Hu | 81/60 |
| 2002/0166416 A1 | 11/2002 | Hu | |
| 2003/0196522 A1 * | 10/2003 | Hu | 81/63.2 |

OTHER PUBLICATIONS

U.S. Appl. No. 10/437,860, filed May 14, 2003, Chaconas et al.

* cited by examiner

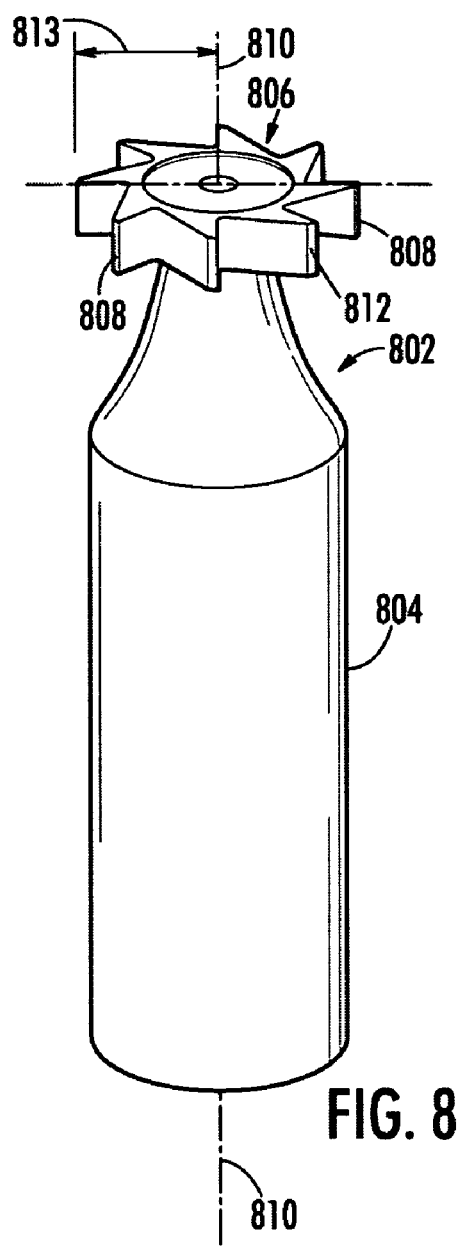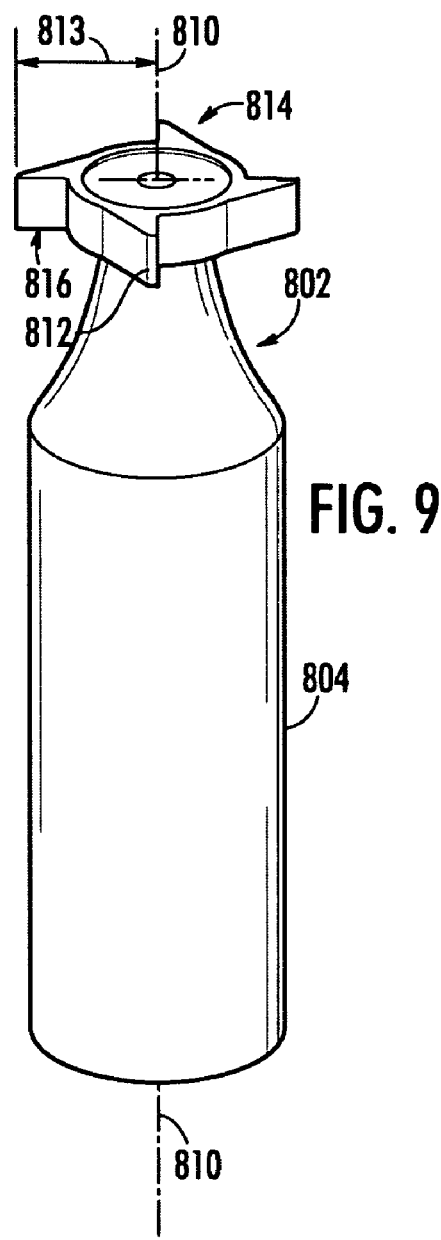
FIG. 8
FIG. 9

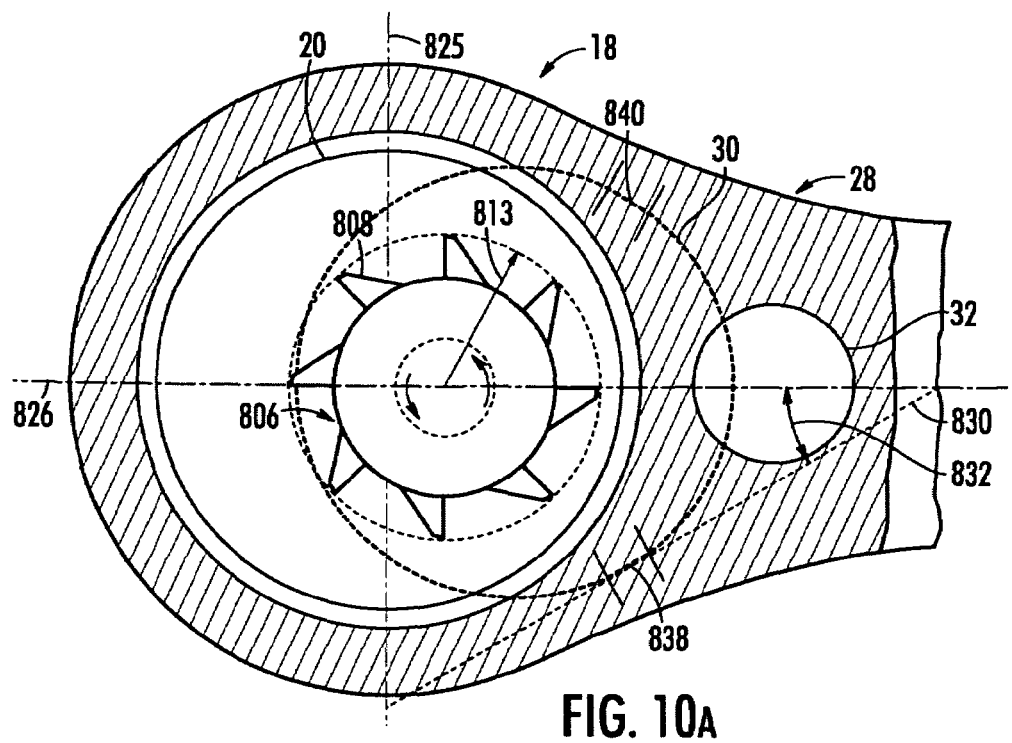
FIG. 10A
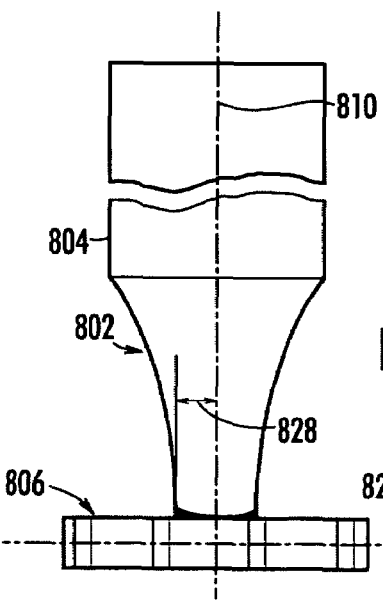
FIG. 10B
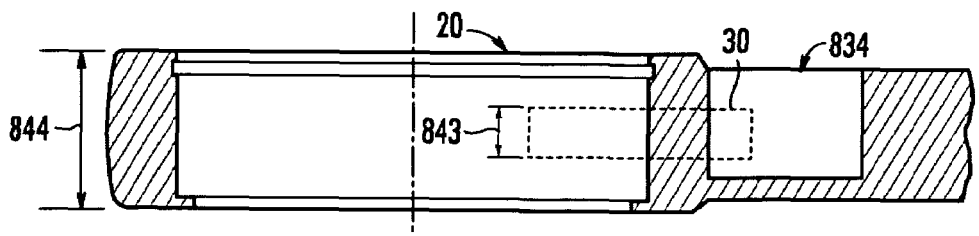

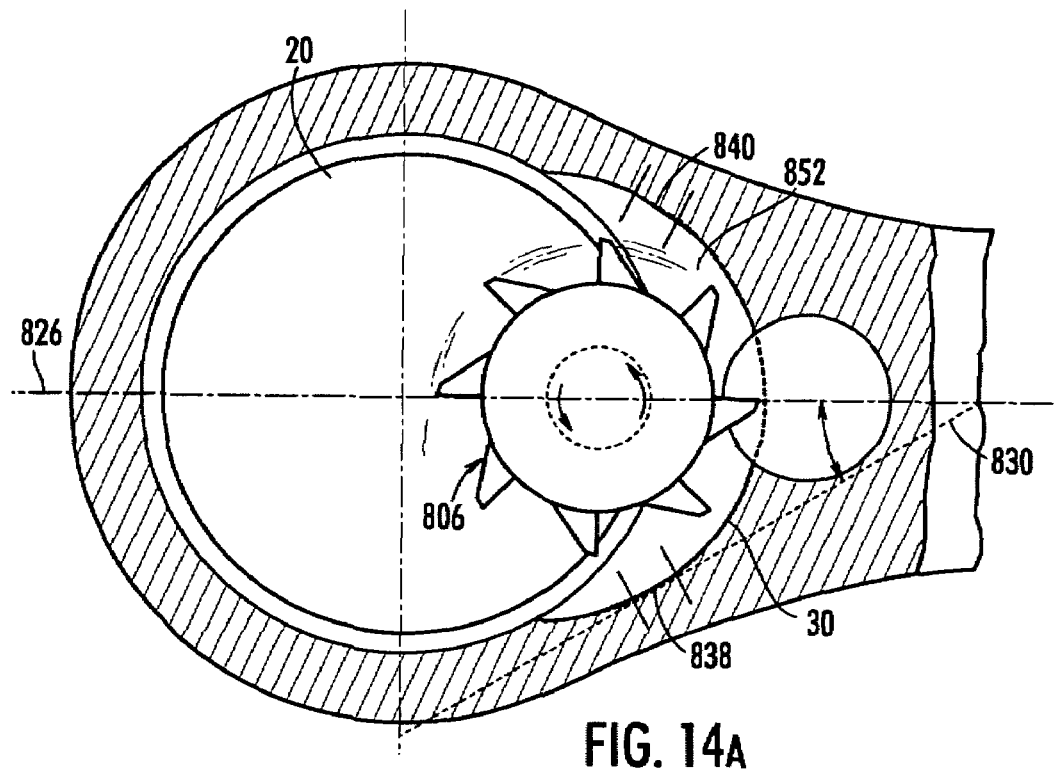
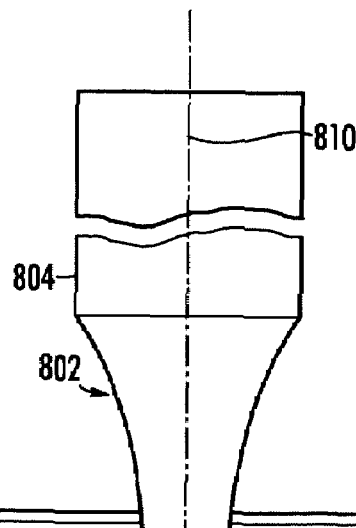
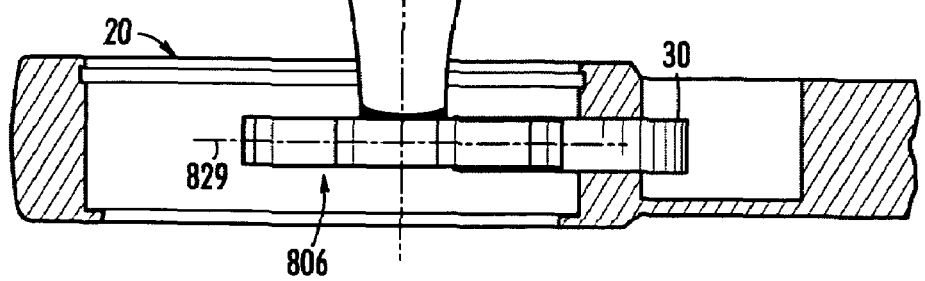
FIG. 14A
FIG. 14B

US 7,073,412 B1

METHOD OF FORMING A PAWL POCKET FOR A RATCHETING TOOL AND TOOL THEREBY FORMED

BACKGROUND OF THE INVENTION

Ratcheting tools, for example socket wrenches and ratcheting box end wrenches, may include a generally cylindrical ratchet gear and a pawl that controls the gear's ratcheting direction so that the gear may rotate in one direction but is prevented from rotation in the other. It is known to dispose the pawl so that it engages teeth either on the gear's inner or outer diameter. It is also known that the size, shape, and method of forming a pawl pocket can have an effect on the functionality of ratcheting tools. Examples of ratcheting tools having a sliding pawl engaging the outer diameter of a ratchet gear are provided in U.S. Pat. Nos. 6,230,591 and 5,636,557, the entire disclosure of each of which is incorporated by reference herein.

The present invention recognizes and addresses considerations of prior art constructions and methods and provides a method of forming a pawl pocket for a ratcheting tool with flat surfaces and a tool thereby formed.

In an embodiment of a method of forming an enclosed pawl pocket that is integral with a neck portion of a wrench, the wrench has a handle and a head integral with the handle and defines the integral neck portion between the head and the handle. The head defines a bore having an axis extending between a first side of the wrench and a second side of the wrench. The bore has an opening to at least the first side of the wrench. A keyway cutter has a planar cutting head disposed on an elongated pin having an axis. The plane of the cutting head is perpendicular to the pin axis, and the cutting head has a radius defined in the plane of the cutting head between a center of the cutting head and the outermost edge of the cutting head. The cutting head radius is less than the bore radius.

The keyway cutter enters the bore through the opening in the first side so that the cutting head is in an operating plane that is perpendicular to the bore axis. While maintaining the cutting head in the operating plane, the cutting head is moved into the neck portion along a predetermined path so that the cutting head cuts the pawl pocket into the neck portion. The predetermined path defines at least two flat surfaces on respective opposing sides of the pawl pocket. Each of the flat surfaces defines an angle in the range of about 27 to 35 degrees, and preferably approximately 31 degrees, between a centerline of the pawl pocket and the flat surfaces.

The accompanying drawings, incorporated in and constituting part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 5A:
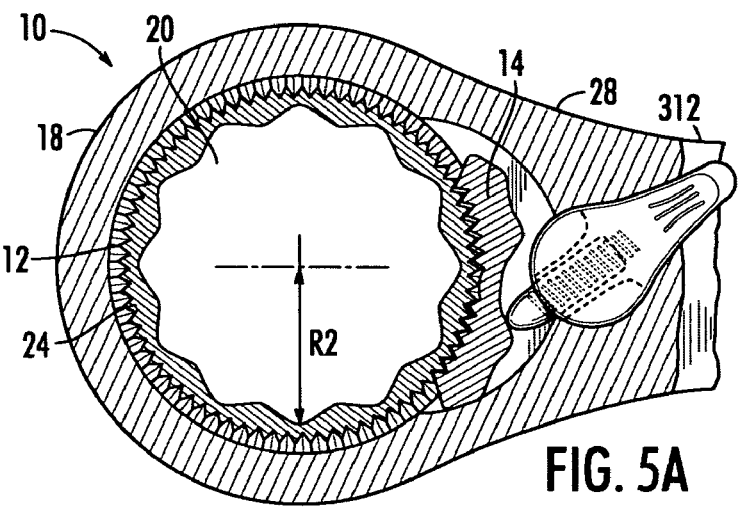
Figure 5B:
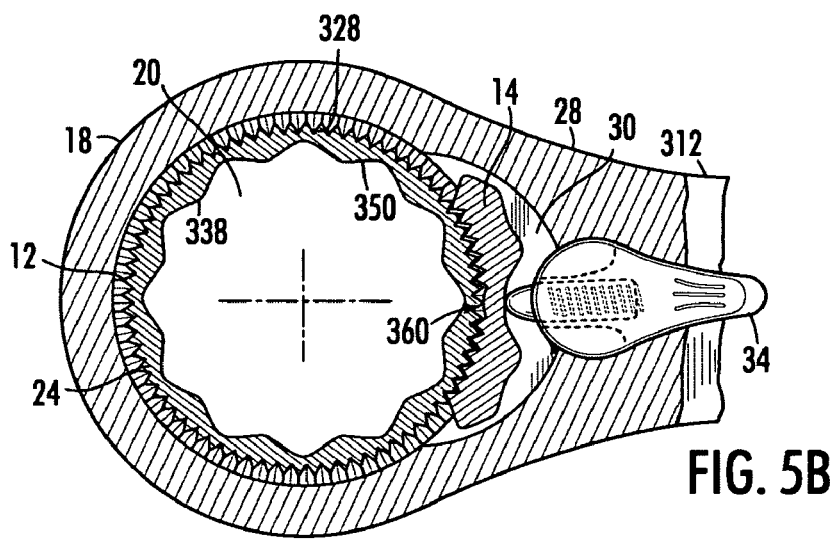
Figure 5C:
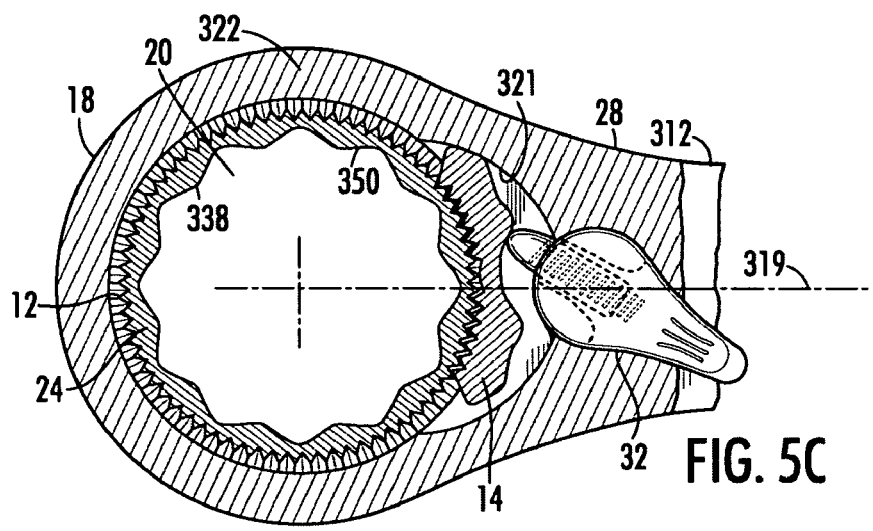
Figure 5D:
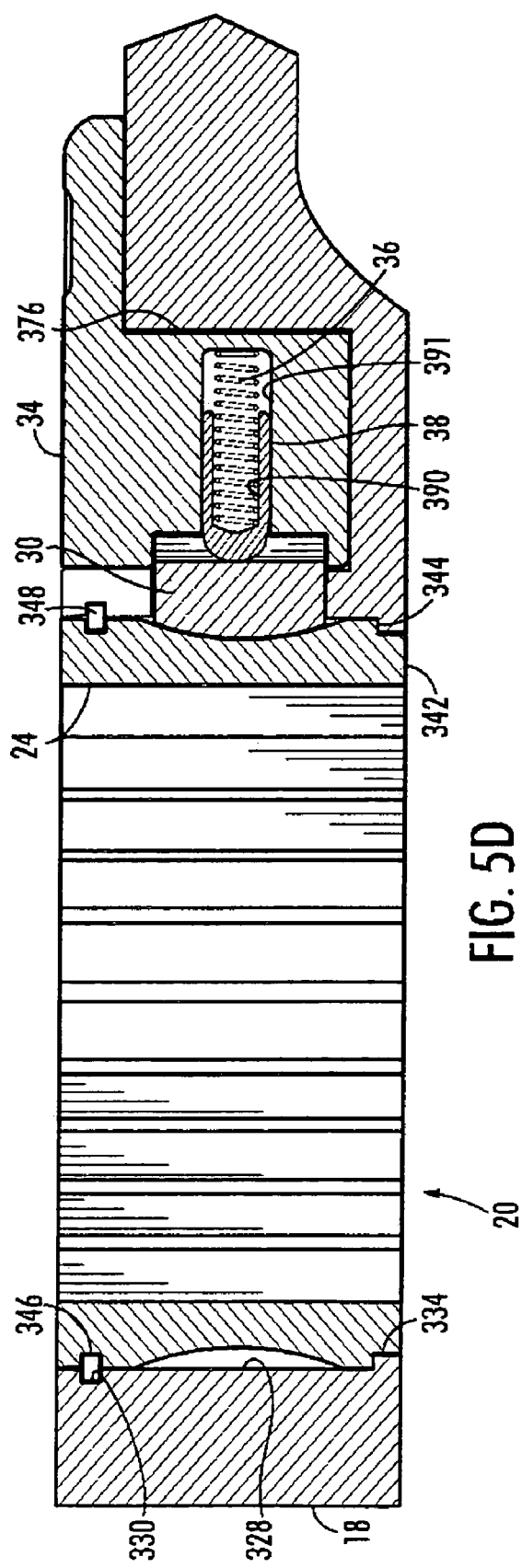
Figure 5E:
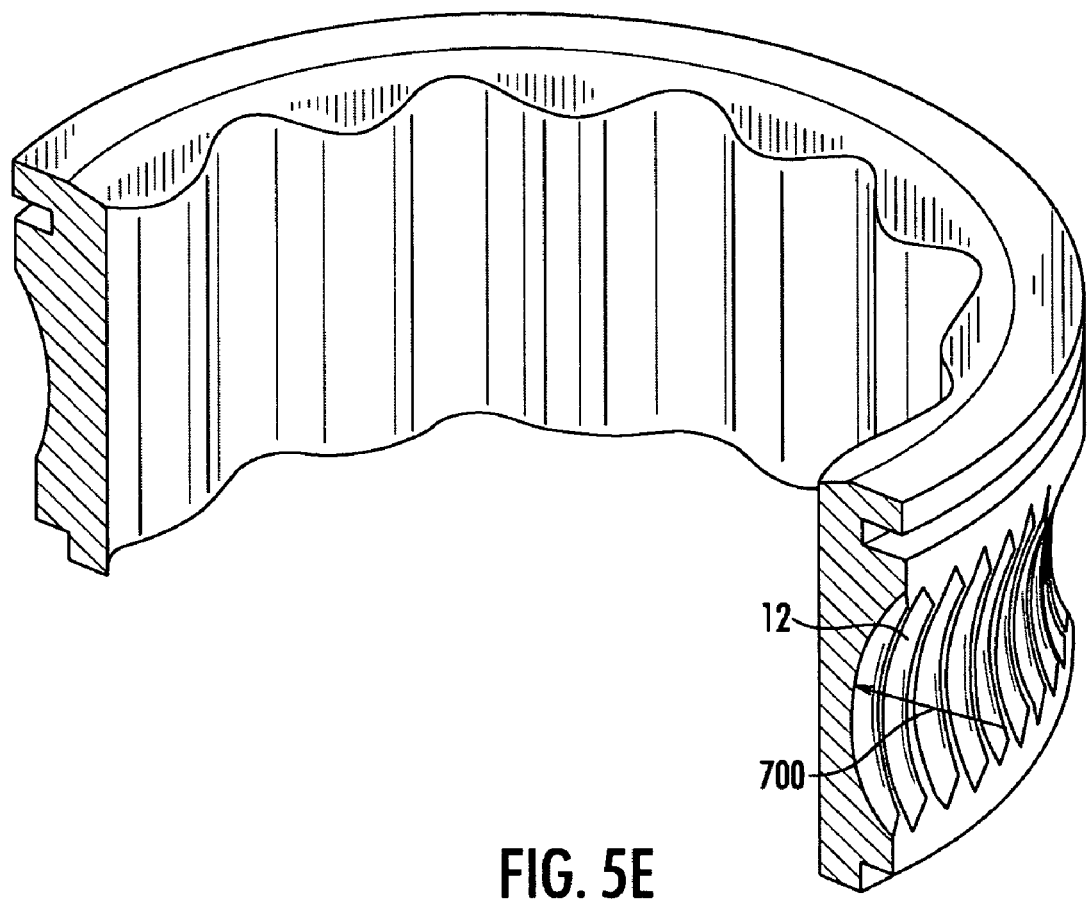
Figure 5F:
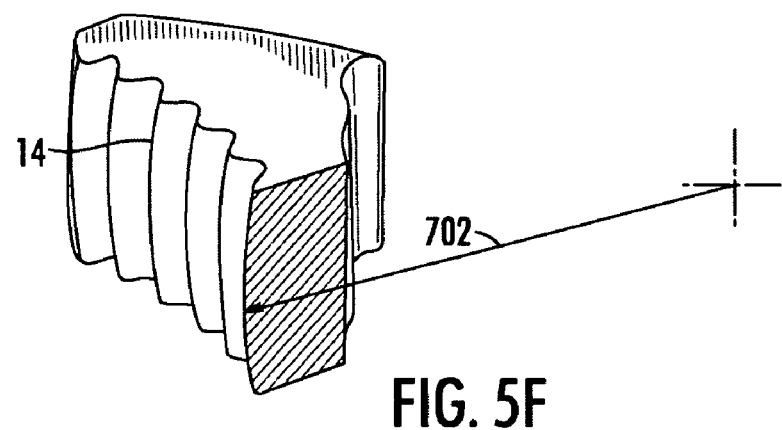
Figure 6A:
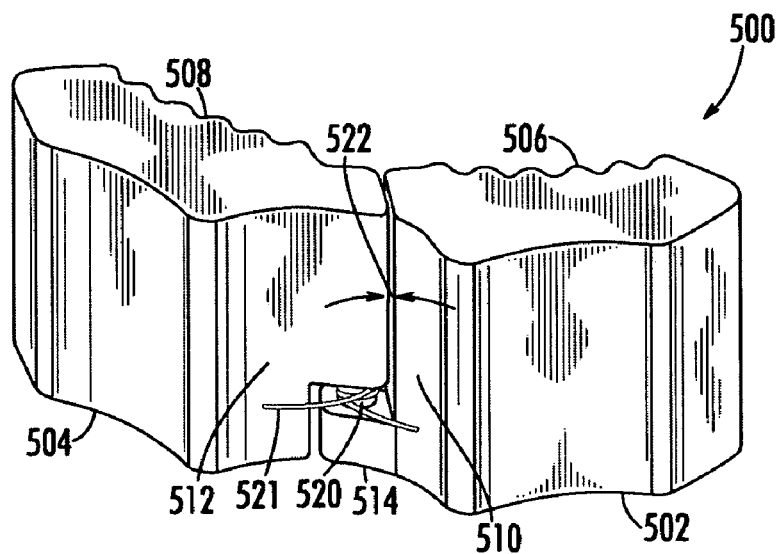
Figure 6B:
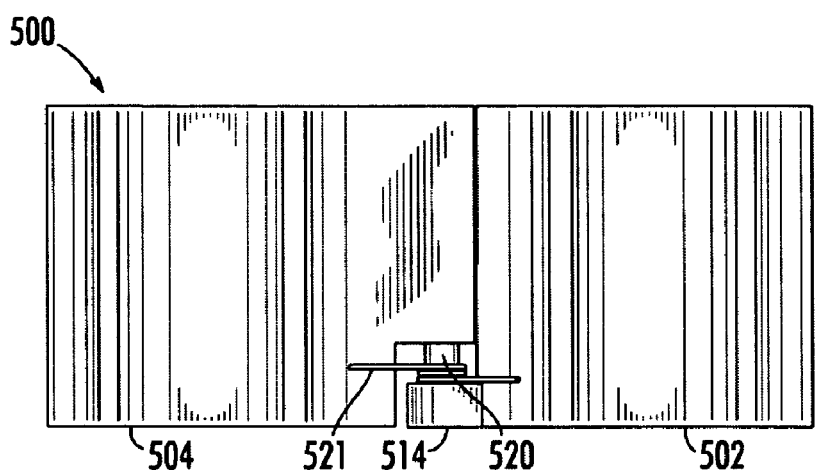
Figure 6C:
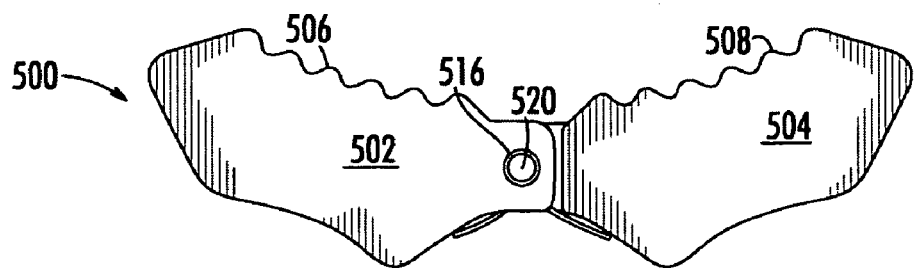
Figure 7:
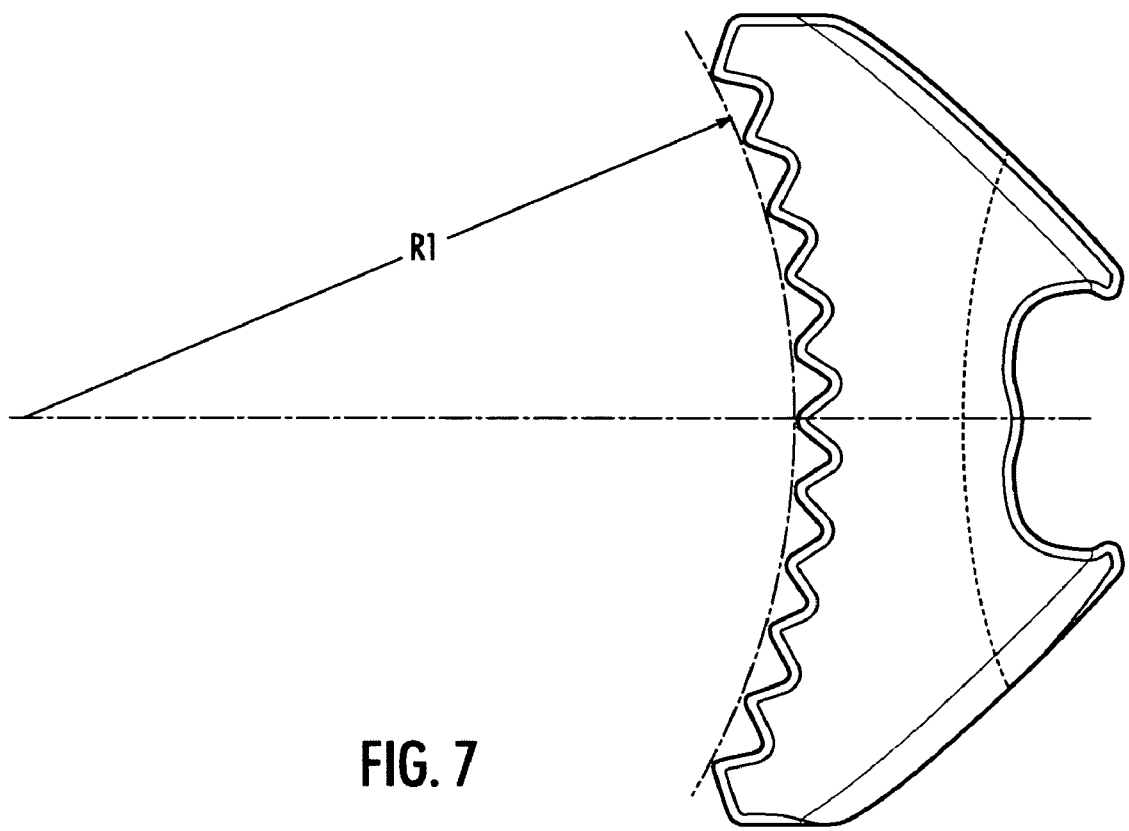

Each of FIGS. 5A, 5B, and 5C is a top view, partly in section, of a wrench in accordance with an embodiment of the present invention;

FIG. 5D is a partial cross-sectional view of the wrench shown in FIGS. 5A–5C;

FIG. 5E is a cross-sectional perspective view of a gear for use in the wrench shown in FIGS. 5A–5C;

FIG. 5F is a cross-sectional perspective view of a pawl for use in the wrench shown in FIGS. 5A–5C;

FIG. 6A is a perspective view of a pawl in accordance with an embodiment of the present invention;

FIG. 6B is a back view of the pawl shown in FIG. 6A;

FIG. 6C is a bottom view of the pawl shown in FIG. 6A;

FIG. 7 is a top view of a pawl in accordance with an embodiment of the present invention;

FIG. 8 is a perspective view of an eight-tooth keyway cutter atop an elongated pin;

FIG. 9 is a perspective view similar to FIG. 8, except the keyway cutter has only four teeth;

FIG. 10A is a cut-away top view of the head of a ratcheting tool with a cutting head below the head's bore;

FIG. 10B is a side view of the same configuration shown in FIG. 10A; and

FIGS. 11A, 11B, 12A, 12B, 13A, 13B, 14A, and 14B are alternatively top and side partial cut away views of a ratcheting tool according to an embodiment of the present invention and a keyway cutter.

Repeat use of reference characters in the present specification and drawings is intended to represent same or analogous features or elements of the invention.

DETAILED DESCRIPTION OF THE PREFERRED EMBODIENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
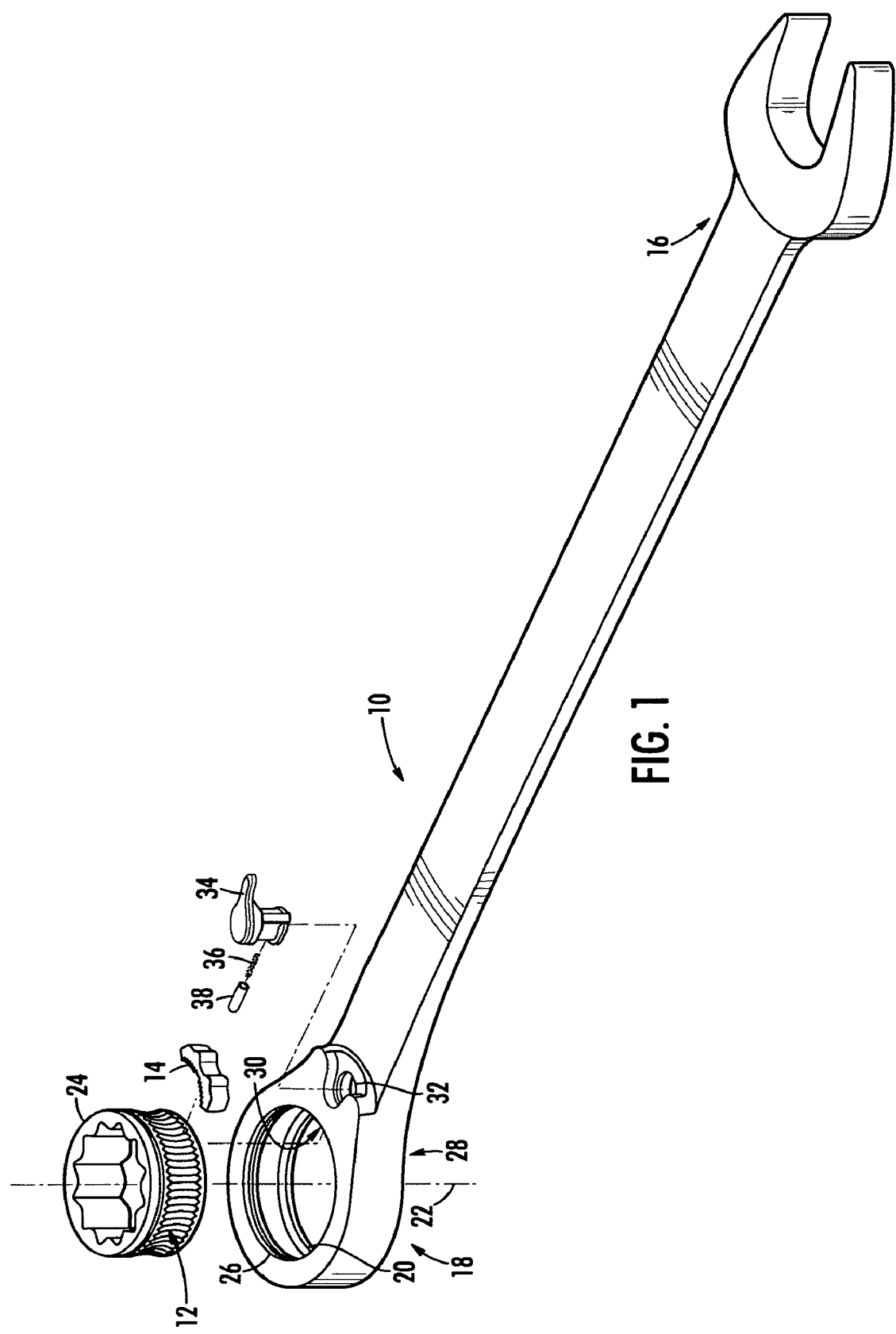
FIG. 1 is a perspective view of a ratcheting tool in accordance with an embodiment of the present invention.
Figure 2:
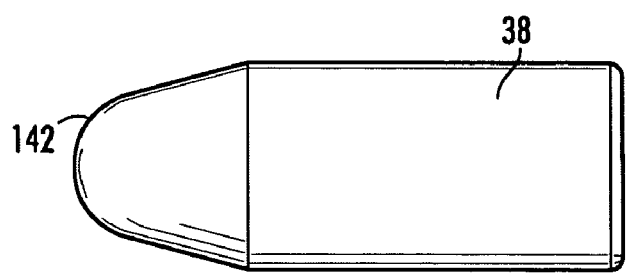
FIG. 2 is a side view of a pusher used in the ratcheting tool as in FIG. 1.
Figure 2A:
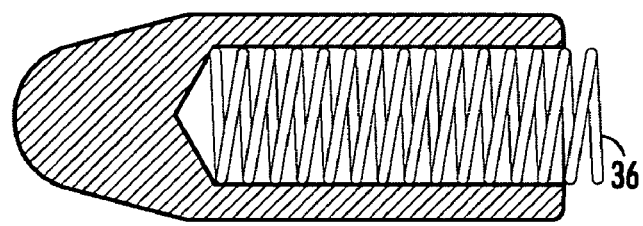
FIG. 2A is a cross-sectional view of the pusher shown in FIG. 2.
Figure 3:
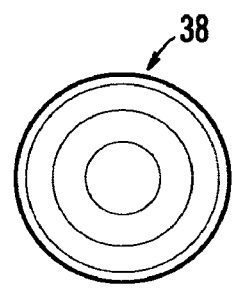
FIG. 3 is a front view of the pusher shown in FIG. 2.

FIG. 1 illustrates a ratcheting box end wrench 10 with vertically curved gear teeth 12 and pawl teeth 14. Ratcheting box end wrench 10 preferably is sufficiently thin so that the wrench may fit in tight places. In this particular ratcheting box end wrench, an open end 16 is included at the wrench's opposite end. Alternatively, a second ratcheting wrench end, or a non-ratcheting box end, or a simple handle could be included instead of open end 16. Tool 10 is preferably formed of hardened steel with a nickel-chrome exterior finish, but could be formed of any suitable steel, other metal, metal alloy, or another suitable material.

Tool head 18 defines a gear bore 20 concentric about a centerline 22. A gear 24 fits within gear bore 20, with a top rim of gear 24 bearing against a bearing surface 26 of gear bore 20. A neck portion 28 connects the head and handle and defines a pawl pocket 30 in which pawl 14 is disposed. Neck 28 also defines a hole 32 that receives a lever 34 having a spring 36 and pusher 38 received within hole 32 so that pusher 38 urges pawl 14 to opposite sides of pawl pocket 30, depending on the position of lever 34.

The radius of a curve defined by the tips of pawl teeth 14 when viewed from above is larger than the radius of a curve defined by the troughs of gear teeth 12. The ratio of the curve defined by the tips of pawl teeth 14 to the troughs of gear teeth 12 is preferably within a range of 1:1.08 to 1:1.3. The depth of the gear teeth and the pawl teeth is approximately 0.020 inches in FIG. 1, which is the tooth depth in a ¾ inch or 19 mm wrench. Other wrench sizes may have different tooth depths.

Preferably, gear teeth 12 are formed uniformly about the gear's circumference. The depth of each tooth, which may be defined as the distance along a radius of the gear extending between the tooth's tip and an arc connecting the troughs beside the teeth, is the same. The internal angle between the sides of a tooth (the "included" angle) is the same for each tooth, and the angle between sides of adjacent teeth (the "adjacent" angle) is the same for each pair of adjacent teeth.

Although the discussion above describes a gear/pawl arrangement in a ratcheting box end wrench, it should be understood that the present invention may encompass other ratcheting tools, for example a socket wrench.

FIGS. 5A–5F show a close-up of tool head 18 in FIG. 1. Head 18 includes a wall 328 that defines generally cylindrical through-hole compartment 20. The smaller compartment 30 is defined in neck portion 28 intermediate head 18 and a handle 312. Generally cylindrical hole 32 extends through a face 322 into neck 28 and overlaps compartment 30. Compartment 30 is closed above and below by top and bottom surfaces of neck 28 and opens into compartment 20. A groove 330 (FIG. 5D) about compartment 20 extends into head 18 from wall 328 proximate the wall's top edge for receipt of a C-ring as discussed below. An annular ledge 334 extends radially inward into compartment 20 from wall 328 proximate the wall's bottom edge.

Both the top and bottom faces of head 18 are closed over compartment 30, which is therefore preferably cut into the neck portion from within the gear bore. Compartment 30 may be formed by a cutting tool controlled by a computer numeric controlled (CNC) milling machine that cuts compartment 30 with the cutting tool (preferably a key-way cutter) inserted into compartment 20. As should be understood in this art, a key-way cutter generally has a shaft with a disk-shaped cutter at the end of the shaft, and cutting edges are formed about the disk's circumference. The disk's radius is greater than the depth of compartment 30, and the disk's height is less than the thickness of neck 28.

Gear 24 has an inner surface 338 that is concentric with wall 328 and that defines a plurality of aligned flats 350 spaced equiangularly about inner surface 338 to engage the sides of a bolt, nut or other work piece. The outer circumference of gear 24 defines vertically-aligned teeth 12. A bottom side of gear 24 defines an extension portion 342 surrounded by a flat annular shoulder 344. Extension portion 342 fits through ledge 334 so that shoulder 344 sits on the ledge and retains gear 24 in the lower axial direction. Extension portion 342 fits through ledge 334 with sufficient clearance so that the ledge secures the gear in the radial direction yet permits the gear to rotate with respect to head 18.

Gear 24 defines an annular groove 346 about its outer surface proximate its upper end. A C-ring 348 extending from groove 346 is compressed inward into the groove as the gear is inserted into the head. When grooves 330 and 346 align, the C-ring snaps into groove 330, thereby securing gear 336 in the upper axial direction.

Pawl 14 is received in compartment 30 so that the top and bottom surfaces of compartment 30 retain the pawl from above and below. A bottom portion 376 of lever 34 defines a blind bore 391 that receives spring 36 and generally cylindrical pusher 38. The pusher defines a blind bore 390 in its rear end and a rounded tip at its front end. Bore 390 receives spring 36, and the spring biases pusher 38 radially outward from bore 391.

Hole 32 in neck 28 receives lever bottom portion 376. The outer diameter of bottom portion 376 is approximately equal to the inner diameter of hole 32, although sufficient clearance is provided so that the reversing lever rotates easily in the hole. The pusher extends into the pocket in the back of the pawl, and rotation of the lever moves the pawl across compartment 30 between its two wedged positions.

As should be understood, the bottom or top face of head 18 may be open so that a non-integral cover plate covers the pawl compartment. Thus, while the pawl compartment of the wrench illustrated herein is enclosed on top and bottom by the web, it should be understood that these embodiments are presented by way of example only.

In operation, as shown in FIGS. 5A to 5C, pawl 14 may slide to either side of pawl pocket 30 laterally with respect to the gear between two positions in which the pawl is wedged between the body and the gear. In FIG. 5A, lever 34 is rotated to its most counter-clockwise position, and pawl 14 is wedged between gear 24 and the loading point of pawl pocket 30. Because pawl 14 is somewhat curved where it contacts the side wall of pocket 30, a large amount of force transfers through the pawl into the forging of the tool at the loading point. The loading point is the point where the pawl makes contact with the side wall of the pawl pocket. Spring 36 pushes pusher 38 forward so that the pusher's front end engages pawl 14 and thereby biases the pawl to the wedged position. If torque is applied to tool 10 (FIG. 1) in the counter-clockwise direction while the tool engages a work piece, the bottom side of pawl pocket 30 pushes the pawl's teeth against opposing gear teeth 12. That is, the pawl remains wedged between the gear and the pawl pocket, and the force applied from the operator's hand to the pawl through the tool is therefore applied in the counter-clockwise direction to the work piece through gear 24.

If an operator applies torque to the handle in the clockwise direction, gear teeth 12 apply a clockwise reaction force to pawl 14. If gear 24 remains rotationally fixed to a work piece, teeth 12 hold the pawl so that the pawl pivots slightly about the third tooth in from the top end of the pawl and moves back and down into pawl pocket 30. This causes the pawl to push back against pusher 38 and the force of spring 36 until the pawl's teeth ride over the gear teeth. Spring 36 then moves the pusher forward, forcing pawl 14 back up toward the top face of pawl pocket 30 and into the next set of gear teeth. This ratcheting process repeats as the operator continues to rotate the tool clockwise.

To change the operative direction of ratcheting tool 10, the operator rotates lever 34 in the clockwise direction (as viewed in FIG. 5B). Lever 34 rotates in hole 32, and the pusher moves clockwise in the pawl pocket. Initially, the pawl pivots slightly, and the load-bearing pawl teeth move away from the gear teeth. As the pusher moves toward the center of pawl 14, the pawl begins to shift up and into pawl pocket 30. Further rotation causes the pawl teeth to ride up and back into pawl pocket 30 over the gear teeth. Gear 24 may also rotate slightly. In this position, pawl 14 moves the pusher back against the force of spring 36. As the operator continues to rotate lever 34, the pusher moves to the other side of pawl 14 and pushes the pawl forward against the opposite side of pocket 30. This applies a clockwise force to the pawl so that the pawl moves upward in pocket 30 and wedges between the gear and pocket 30. When the pawl has moved over to this wedged position, the configuration and operation of the gear, the pawl, and the lever mirror the pawl's operation described above with respect to FIG. 5A. That is, the tool ratchets and applies torque to a work piece in the same manner but in the opposite direction.

The wrench illustrated in FIGS. 5A–5F may be manufactured to different sizes. A wrench's size is denoted by the size of the work piece received within the gear so that flats 350 engage and apply torque to the work piece. That is, for example, a ¼ inch wrench can turn a ¼ inch hex or twelve-point fastener.

The sizes of the gear and the pawl in the wrench preferably vary with the size of the overall tool. In one preferred embodiment, the tooth depth on both the gear and the pawl is approximately 0.012 inches for a 8 mm or 10 mm wrench. As noted above, the tips of the pawl teeth define a curve having a radius that is larger than a radius of a curve defined by the troughs of the gear teeth. The ratio of the gear radius to the pawl radius for a given wrench is preferably within the range of 1:1.08 to 1:1.3. In one preferred embodiment of a one-quarter inch ratcheting box end wrench, the gear/pawl radius ratio is 1:1.09. In exemplary five-sixteenth, one-half, five-eighths, and three-quarter inch wrenches, the ratio in each wrench is within the range of 1:1.08 to 1:1.30.

In defining the arc ratio, the gear tooth radius and pawl tooth radius are preferably considered at a plane passing mid-way between the top and bottom halves of the gear and the pawl, as shown in FIGS. 5A–5C.

As also indicated in FIGS. 5A–5C, the center two pawl teeth may be eliminated to form a bridge 360. This does not affect the design of the teeth on either side of the bridge. For example, a full set of pawl teeth may be designed, with an additional step of eliminating the center or, if the pawl's center line runs between two teeth instead of a single center tooth, the two center teeth. As should be understood in this art, the center teeth perform little or no work. It is believed that their removal may facilitate the pawl's ratcheting and transition movements. Methods of defining the pawl tooth shapes are disclosed in Applicant's co-pending U.S. application Ser. No. 10/939,200, filed Sep. 10, 2004, and entitled Ratcheting Tool with Vertically Curved Tooth Arrangement, the entire disclosure of which is incorporated by reference herein.

FIGS. 5A–5F illustrate that the gear and pawl teeth need not necessarily extend straight from the top to the bottom of the gear and pawl. That is, assuming the gear is positioned so that its cylindrical axis 22 (FIG. 1) is vertical, the gear teeth may extend in straight vertical lines between the opposite axial ends of the gear (correspondingly, the pawl teeth would also extend in straight vertical lines between the top and the bottom of the pawl face), or, as should be understood in this art, the outside gear surface at the center of the gear may be less than the diameter at the top and bottom so that the gear's outer surface is concave, and the gear teeth extend vertically between the top and bottom of the gear in an inward curve. Thus, FIG. 5A, which illustrates a top view of a section of the gear taken mid-way between the gear's top and bottom ends, illustrates the gear teeth curving outward at the gear's bottom edge. The pawl face is formed in a correspondingly convex shape so that the pawl teeth extend between the top and bottom of the pawl in an outward curve to interengage with the gear teeth. Examples of a concave gear and a convex pawl are shown in FIGS. 5E and 5F.

Referring particularly to FIGS. 5E and 5F, a radius 700 of the arc extending between opposite axial edges of the gear and defined by the troughs between concave vertical gear teeth 12 may be equal to a radius 702 of the arc extending between top and bottom sides of the pawl face and defined by the edges of convex vertical pawl teeth 14. However, to allow for the effects of manufacturing tolerances in the alignment of the vertical teeth on the gear and the pawl, and of twisting deformation of the gear under high torque loads, the pawl's convex radius 702 is preferably less than the gear's concave radius 700. In an embodiment of a three-quarter inch ratcheting box end wrench, for example, concave gear radius 700 is 0.236 inches, while convex pawl radius 702 is 0.200 inches. This arrangement permits effective operation of the wrench even if the gear and/or pawl teeth are as much as 0.015 inches out of vertical alignment.

The radius ratio of the pawl radius and gear radius in the horizontal plane does not affect the design of the pawl and gear's vertical radius of curvature. As stated earlier, it is desirable to have the pawl's horizontal radius larger than the gear's radius, preferably having a pawl teeth tip radius (R1 in FIG. 7) to gear teeth trough radius within a range of 1:1.08 to 1:1.3. To achieve this condition, the geometry of the pawl teeth may need to be adjusted. It is believed that any changes made to the design of the pawl's teeth in the horizontal plane will not affect the selection of an optimal vertical radius of curvature mismatch between the pawl and the gear. The design of the pawl in the horizontal plane could be performed before or after the design of the vertical radius of curvature mismatch because one design is not believed to be dependent on the other. Including both horizontal plane adjustments a vertical radius of curvature mismatch is thought to provide a tool with the benefits of both improvements.

Additionally, it should be understood that the concave and convex radii of the gear and the pawl, respectively, may be defined at any suitable position on the gear and the pawl that oppose each other when the pawl teeth engage the gear teeth. Thus, for example, the concave gear radius may be defined at the edge of the gear teeth while the convex pawl radius may be defined at the troughs between the pawl teeth.

Furthermore, the construction of the ratcheting tool may affect the extent or the desirability of a mismatch between the concave and convex vertical radii of the gear and the pawl. For example, a gear in a tool as shown in FIG. 5D, in which the gear is retained from the top by a C-clip, may be subject to greater twisting deformation than a gear retained from the top by the tool head itself because the latter construction exerts greater resistance against forces in the upward direction typically applied through the gear when the tool is in use. Accordingly, while a mismatch between the profile radii of the gear and the pawl may be employed in either arrangement, it is particularly desirable in a construction in which the gear is retained from the top by a retainer other than the wrench body, such as in the embodiment shown in FIG. 5D.

Figure 4:
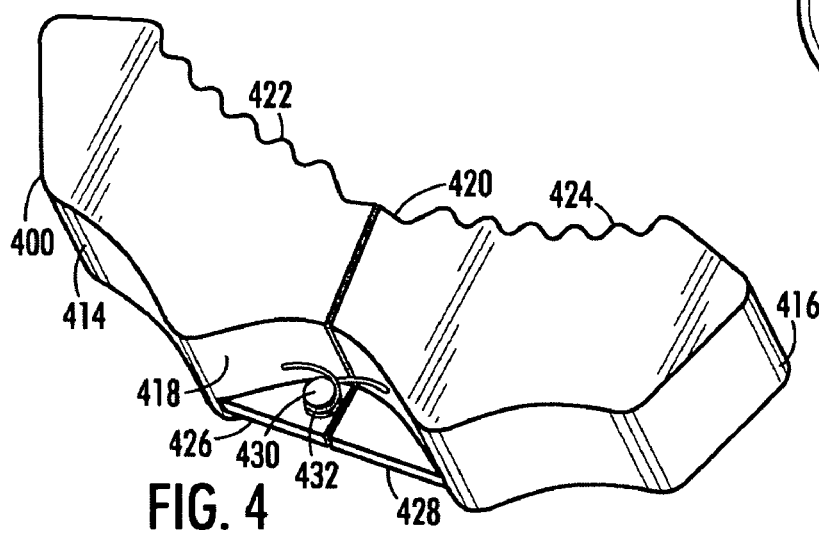
FIG. 4 is a perspective view of a pawl in accordance with an embodiment of the present invention.
Figure 4A:
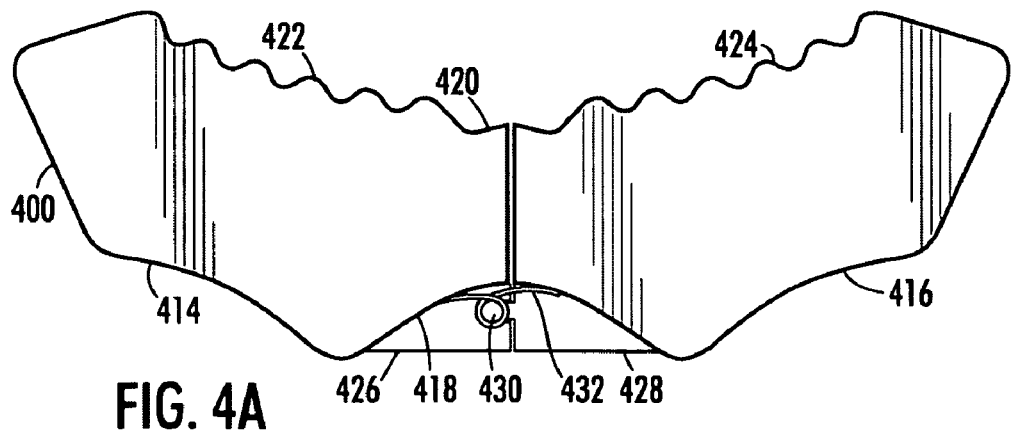
FIG. 4A is a top view of the pawl shown in FIG. 4.

The definition of a ratio between the gear radius and the pawl radius (R1 in FIG. 7) that is less than 1:1 (i.e., the gear radius is less than the pawl radius) facilitates the pawl's removal from the gear when the pawl transitions from one side of the pawl compartment to the other. Referring to FIGS. 4 and 4A, this may also be accomplished by a pawl 400 having a shape similar to the pawl shown in FIGS. 5A–5C, such that (1) the pawl teeth are disposed uniformly across the face of the pawl at a radius equal to the gear radius and (2) the pawl is formed in two halves hinged together so that the halves pivot with respect to each other. The pawl may be disposed in a compartment of a wrench constructed like the wrench of FIGS. 5A–5F. While the construction of the wrench is not discussed in further detail, it should be understood that the pawl may be employed in a variety of wrench designs and may be used in other types of ratcheting tools. Thus, it should be understood that the shape of the pawl may vary to accommodate the design of the tool in which it is used and that the embodiments described herein are provided for purposes of example only.

Discussing the pawl in FIGS. 4 and 4A in greater detail, pawl 400 is split into two halves 414 and 416 along a line from the back of a pawl pocket 418 to a bridge 420 separating symmetric sets of pawl teeth 422 and 424 on either side of the pawl face. The cut between the two halves extends completely through the pawl, including a shelf extending rearward from a bottom area of the pawl pocket that is separated into two halves 426 and 428.

A tab extends from shelf half 428 into a corresponding groove defined in shelf half 426. The tab begins as a narrow finger and expands at its end into a circular cross-section. The tab is sized so that a small gap is left between halves 414 and 416, thereby permitting the halves to pivot slightly about the tab's circular portion. In the embodiment illustrated in FIGS. 4 and 4A, the halves may pivot by approximately ten (10) degrees. It should be understood, however, that the angle through which the halves may be allowed to pivot with respect to each other may vary and should be chosen in accordance with the design of a given tool. For example, the angle may be bounded on the high end by the shape of the back of the pawl and the shape of the pawl compartment. If the design of the pawl and/or the compartment wall is such that it is possible that the pawl's engagement with the wall could so inhibit the pawl's transition from one side of the compartment to the other, the gap between the pawl halves should be set so that the pawl halves cannot pivot to such a degree. On the low end, the pawl halves should be allowed to pivot at least such that the pawl easily disengages from the gear when transitioning from one side of the pawl compartment to the other.

The pawl halves may be allowed to pivot freely within the allowed angle. In a preferred embodiment, however, the end of the pivot tab extends upward into a cylindrical pin 430, and a spring 432 wraps around the pin so that opposing ends of the spring bias the pawl halves together.

Referring again to FIG. 4, the top of pin 430 is low enough so that the pusher may swing across the pawl pocket without interference from the pin. In the embodiment illustrated in FIGS. 6A–6C, the pivot pin remains below the path of the pusher (not shown) but is aligned parallel to the pawl face. More specifically, pawl 500 includes two halves 502 and 504 on which are defined symmetric sets of pawl teeth 506 and 508 that, when the pawl engages the gear, define a common radius with the gear teeth. Pawl half 502 includes a tab 514 that extends into a notch formed in half 504. Tab 514 includes a cylindrical through-hole 516 that receives a cylindrical pin 520 extending from pawl half 504 so that the pawl halves may pivot with respect to each other about the pin. Tab 514 extends a distance from pawl half 502 so that a gap 522 between the halves permits the halves to pivot to a desired angle. A coil spring 521 wraps around pin 520 so that opposing ends of spring 521 bias the pawl halves toward the gear. The pusher tip (not shown) engages, and moves between, pawl pocket sides 510 and 512 above pin 520 and tab 514.

As discussed above, a keyway cutter may be used to form a pawl pocket in the neck of a ratcheting tool. Referring to the drawings, and particularly to FIGS. 8 and 9, a keyway cutter 802 has a cutting head 806 located atop an elongated pin 804, where head 806 and pin 804 are concentric about a centerline 810. The cutter is preferably formed of hardened steel but could be formed of any suitable material with a high hardness and resistance to wear. The radius of elongated pin 804 shown in the preferred embodiment tapers from a larger radius to a smaller radius where the pin attaches to cutting head 806.

Cutting teeth 808 in FIG. 8 and cutting teeth 816 in FIG. 9 protrude away from centerline 810 with edges 812 of the cutting teeth defining the keyway cutter's cutting radius 813. The size of the cutting radius may change somewhat during use of the keyway cutter due to wear and sharpening of the cutting teeth. The path of the keyway cutter may be adjusted, however, to compensate for the cutter's reduced radius.

Although preferred embodiments of eight and four cutting teeth are shown in FIGS. 8 and 9, respectively, cutting head 814 may have any number of cutting teeth around its circumference. While a greater number of teeth may reduce the rate of wear on the teeth in that the cutting forces are dispersed over a larger area, keyway cutters with more teeth are more expensive.

Referring now to FIG. 10A, keyway cutter cutting head 806 having a cutting radius 813 defined by cutting tooth edges 812 is inserted into gear bore 20 in ratcheting tool head 18. In a preferred embodiment, the cutting head is arranged to rotate counterclockwise when removing material, although it should be understood that other tooth configurations and clockwise rotations are possible.

The center of bore 20 is the intersection of centerlines 825 and 826. As indicated in FIG. 10B, the keyway cutter is moved down from above the bore such that axis 810 of the elongated pin is aligned with the intersection of centerlines 825 and 826. While it is not important that this exact movement occurs, the keyway cutter preferably does not contact head 818 of the tool during this initial positioning.

As discussed in more detail below, cutting head 806 moves into the neck portion of tool 28 and removes material to form pawl pocket 30. The pocket preferably defines two flat surfaces 838 and 840. A vertical (i.e., normal to the page of FIG. 10A) plane 830 includes flat surface 838 and intersects centerline 826, forming angle 832 between the plane and the centerline. Flat surface 840 is formed at the same angle 832 from centerline 826. Angle 832 preferably is between about 27 and 35 degrees and is approximately 31 degrees in a preferred embodiment.

The cutting head is disposed in a plane 829 perpendicular to pin axis 810. When cutting head 806 moves into bore 20, as in FIG. 11B, plane 829 becomes the cutting head's operating plane. As used herein, "operating plane" refers to a plane in which the cutting head moves into in the tool's neck portion 820 during the removal of material to form the pawl pocket. Operating plane 829 is aligned with the plane of pawl pocket 30.

Note that the difference between cutting disc radius 813 and radius 828 of the elongated pin near the cutting disc is greater than the desired depth of the pawl pocket along the pawl pocket's centerline 826, thereby allowing cutting head 806 to wear over time. If pin radius 828 is too large, or if cutting head radius 813 is too small, the keyway cutter would not be able to reach the desired maximum pawl pocket depth. The allowance built into the keyway cutter for wear may be determined based on known wear rates for certain types of keyway cutters when cutting certain materials, or the allowance may be determined experimentally.

Thickness 844 of head 18 is greater than a thickness 843 of the pawl pocket to be cut. Pawl pocket thickness 843 preferably depends upon the pawl thickness. The pawl thickness preferably optimizes the opposing desire for a thin tool to fit into tight work spaces with the desire to achieve a particular wrench strength, a larger pawl generally being stronger than a smaller pawl.

Figure 11A:
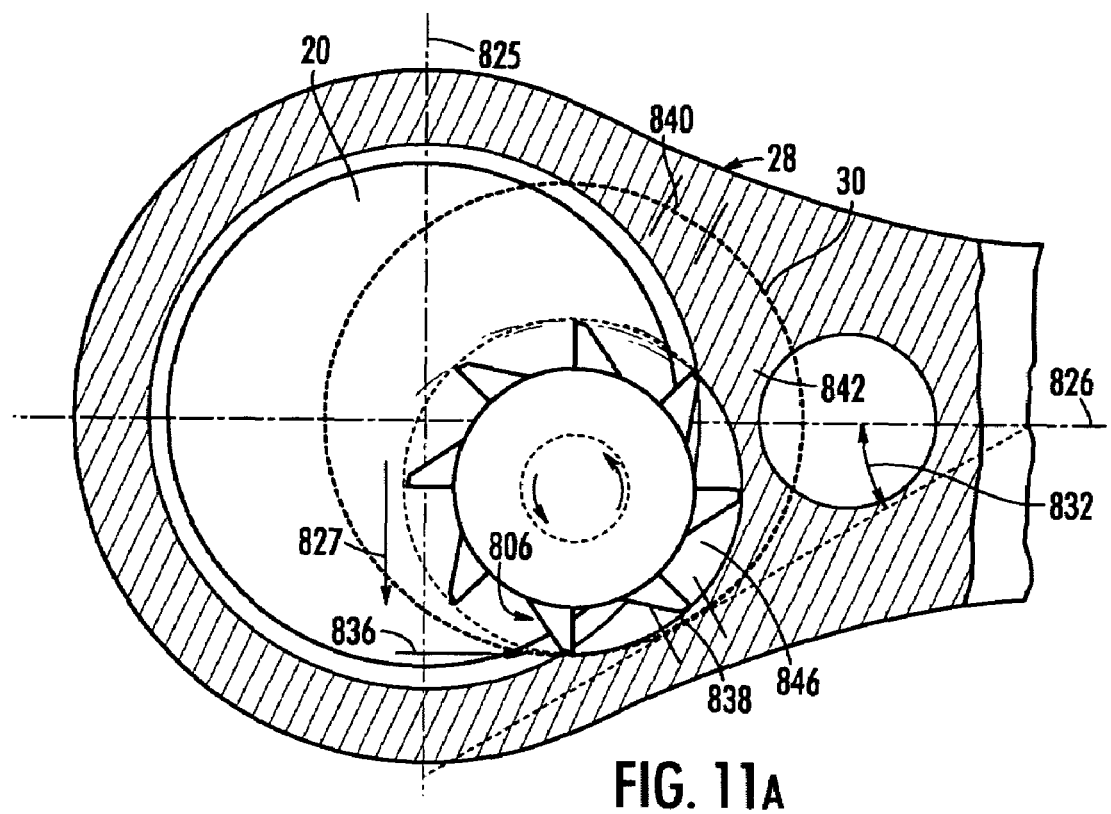
Figure 11B:
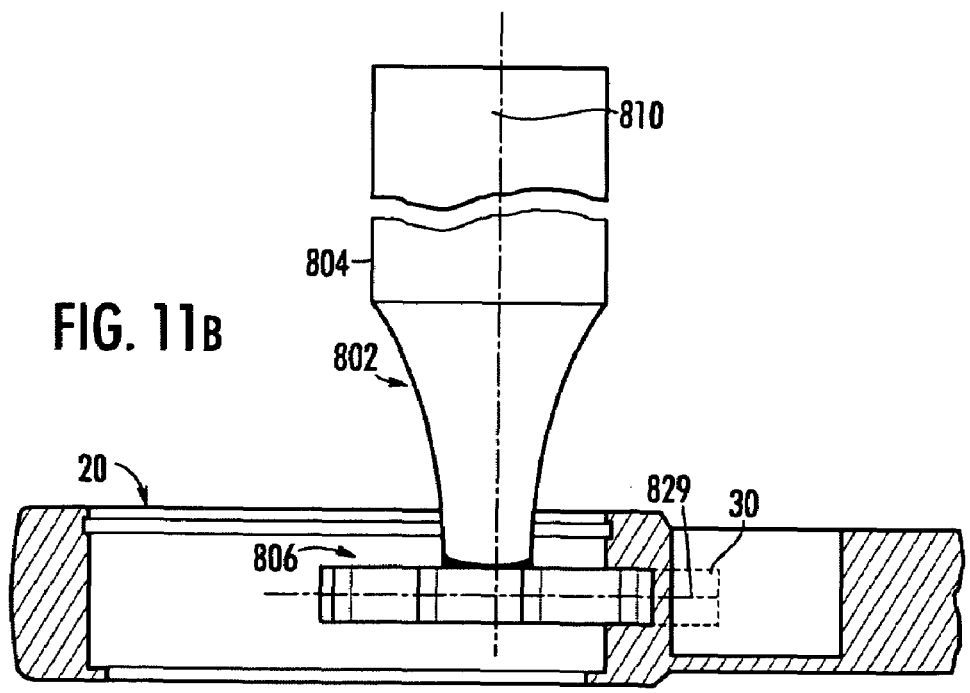

In FIGS. 11A and 11B, cutting head 806 begins to remove material from the first opposite side of the tool's neck portion 28 to form the first opposite side of pawl pocket 30 by moving cutting head 806 within plane 829. Cutting head 806 initially moves so that centerline 810 (FIGS. 8 and 9) moves laterally, i.e., along or parallel to centerline 825 in the direction indicated by arrow 827, from the intersection of lines 825 and 826 until the diameter defined by radius 813 reaches a line parallel to centerline 826 and tangent to the pawl pocket. Head 806 then moves in plane 829 so that centerline 810 moves in a plane parallel to centerline 826, i.e., in the direction indicated by arrow 836, until the cutting head reaches the position shown in FIG. 11A. Alternatively, the cutting head may be moved so that centerline 810 moves diagonally directly to the position shown in FIG. 11A or in any other convenient pattern. The material between dotted line 30 and bore 20 along operating plane 829 is removed during the cutting process. At the point in the process represented by FIG. 11A, material has been removed in an area 846, while material in an area 842 is yet to be removed.

Figure 12A:
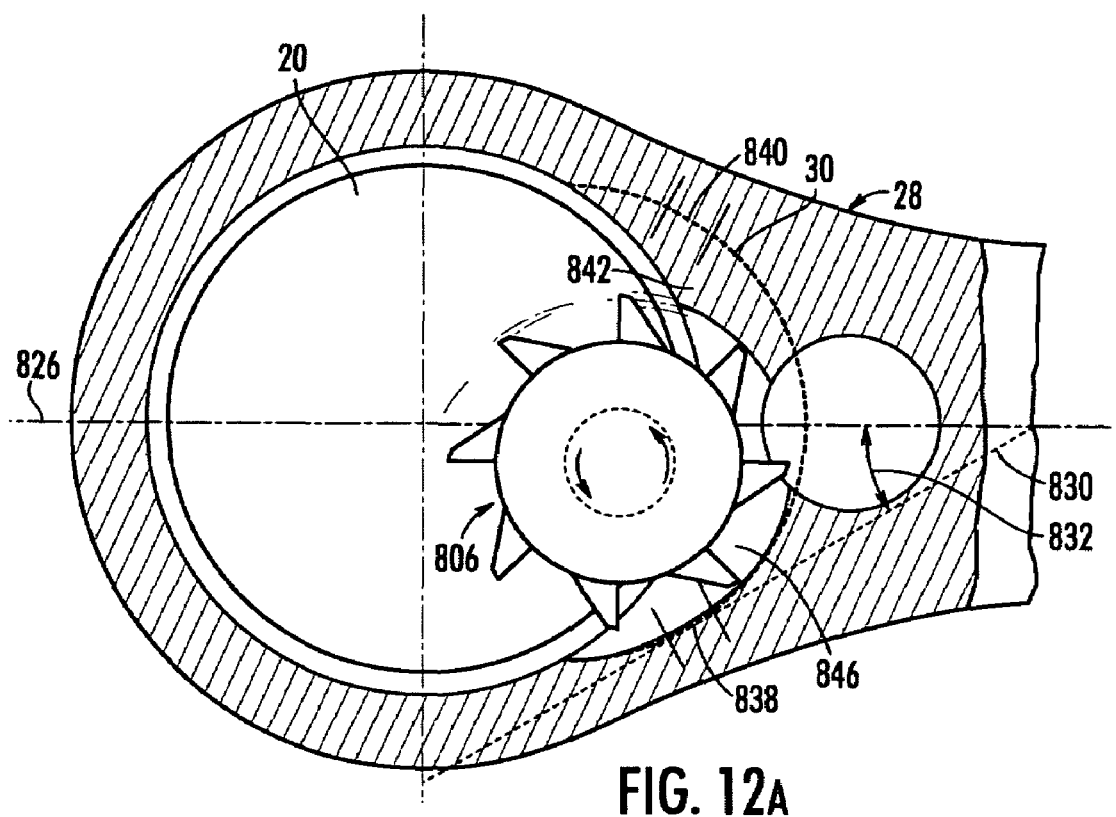
Figure 12B:
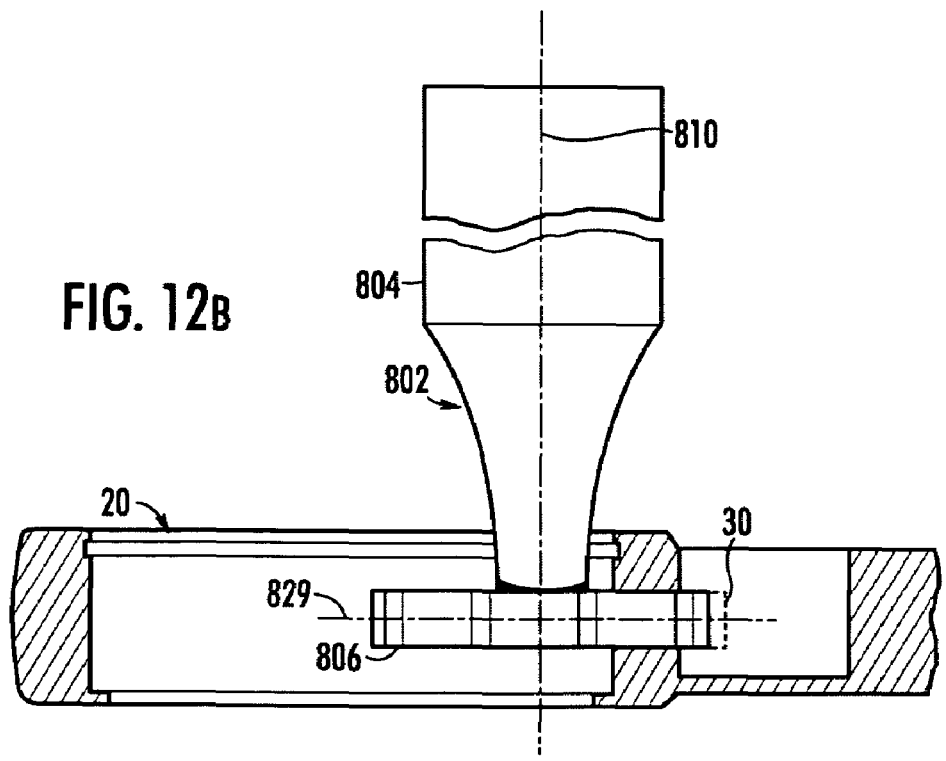

FIGS. 12A and 12B illustrate cutting head 806 after cutting flat surface 838 but before cutting flat surface 840. As discussed previously, flat surfaces 838 and 840 form angle 832 between the flat surfaces and centerline 826 of pawl pocket 836. To form flat surfaces 838 and 840, the keyway cutter moves on a line at angle 832 with respect to centerline 826 for a predetermined distance, delineated by hash marks in the Figures. That is, centerline 810 moves in a plane parallel to plane 830. Preferably, the length of the flat surfaces is in the range of about 0.035 inches to 0.055 inches which is sufficient in the illustrated embodiment to accommodate the loading point of a pawl within the pawl pocket. In a preferred embodiment of a 14 mm wrench as shown in FIGS. 5A–5D, the loading point length is within 0.040 inches to 0.050 inches. The approximately 0.035 to 0.055 inch range is preferred, but it should be understood by those skilled in the art that different pawl geometries and different wrench sizes may necessitate or make desirable shorter or longer flat surfaces.

Depending on the pawl pocket's depth, the flat surface's length and the cutting head radius, the cutting head's movement in cutting the flat surface may or may not completely remove the material in the bottom of the pawl pocket. That is, upon completion of cutting flat surface 838, the cutting head may or may not simultaneously reach the bottom of pocket 30 at centerline 826. If not, cutting head 806 preferably moves in an arc so that centerline 810 moves in an arc corresponding to the arc of pawl pocket wall 836 until the cutting head removes the material in the pocket's bottom area and centerline 810 lies along centerline 826 (some material will be removed from the top half of area 842 as well). Cutting head 806 may then back out from the pawl pocket into the bore along centerline 826 until centerline 810 again reaches the intersection of centerlines 825 and 826, or some predetermined point short of the intersection. Alternatively and preferably, cutting head 806 may continue from the position shown in FIG. 12A and cut the pawl pocket's second opposite side. That is, rather than having the cutting head return to center before cutting the pawl pocket's second opposite side, the cutting head preferably removes material from the entire pawl pocket in one pass.

Figure 13A:
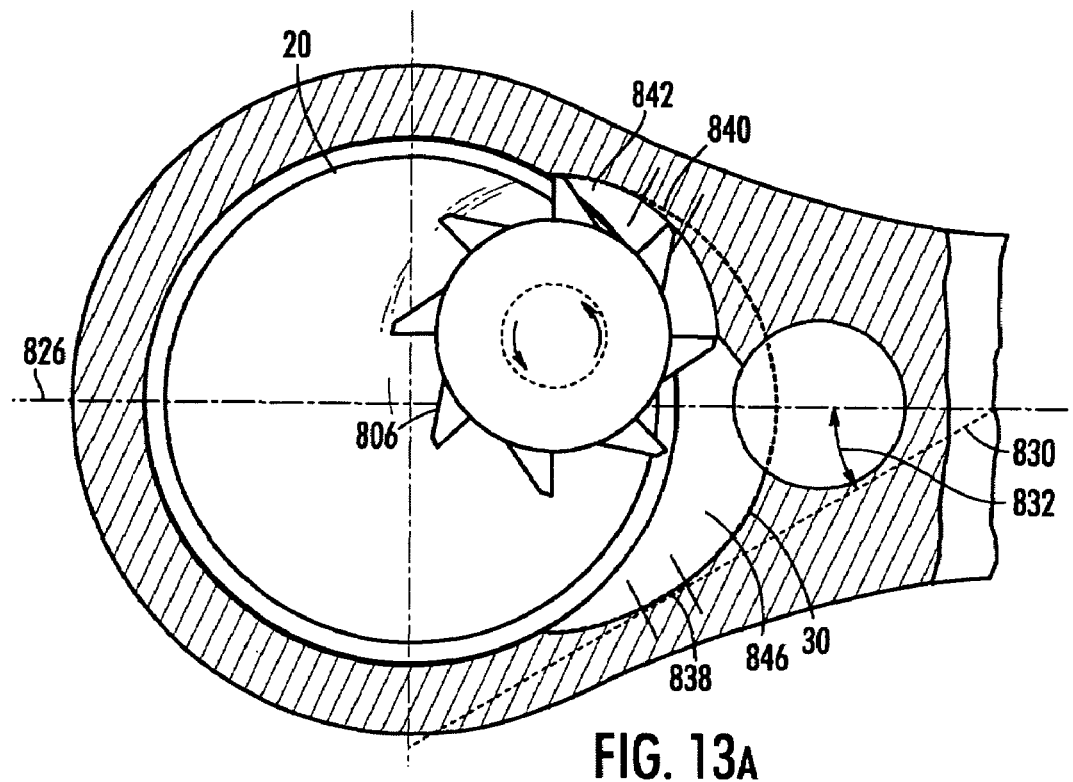
Figure 13B:
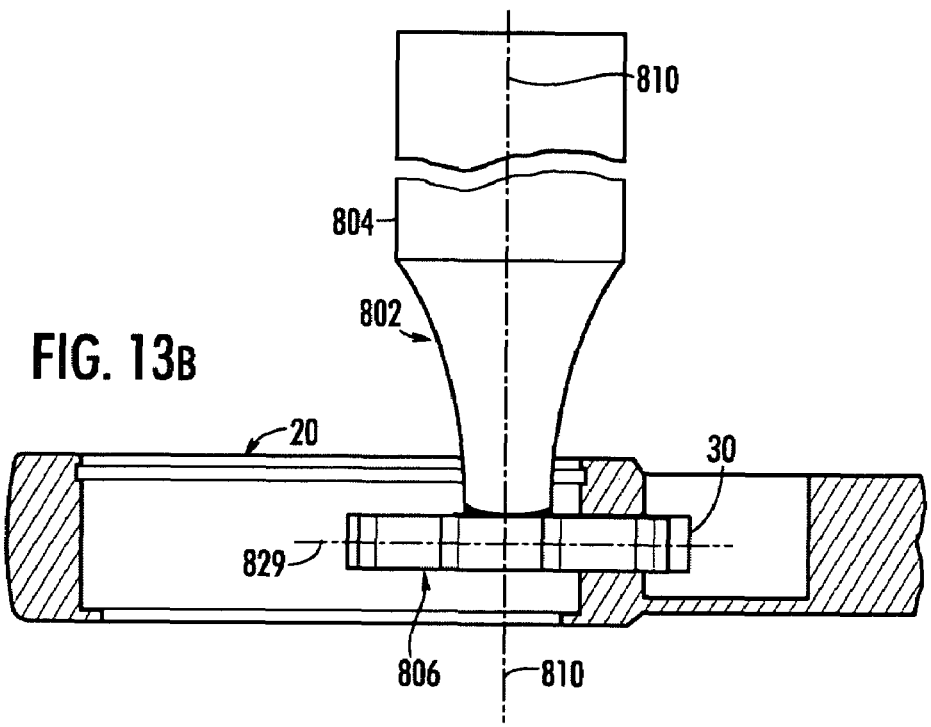

FIGS. 13A and 13B show cutting head 806 as it begins to cut flat surface 840 in the pawl pocket's second opposite side. Flat surface 840 preferably is cut at the same angle 832 from centerline 826 as flat surface 838, only mirrored on the opposite side of pawl pocket 30. To make this cut, the mirror image steps are performed at area 842. The material in area 846 previously has been removed by cutting head 806. As stated previously, an alternate method of cutting the pawl pocket where cutting head 806 cuts the pocket in one pass is preferable to this method shown in FIGS. 13A and 13B.

FIGS. 14A and 14B show cutting head 806 as it completes the removal of material from pawl pocket 30. The predetermined path of the cutting head optionally may remove the material from the completed pawl pocket within the tool's neck portion, and keyway cutter 802 can be removed from the tool through bore 822 prior to the ratcheting tool's assembly. Alternatively, cutting head 806 may complete removal of material in the position shown in FIG. 13A if the pawl pocket is cut in one pass. If the pawl pocket is cut in one pass, keyway cutter 802 must be retracted from the pawl pocket before being removed from the tool through bore 822 prior to the tool's assembly.

The aforementioned process, or any other suitable process, may be executed to form pawl pockets of specific sizes for respective wrench and pawl sizes (i.e. one pawl/pawl pocket for an 8 mm wrench, another pawl/pawl pocket for a 10 mm wrench, etc.). However, using the same pawl and pawl pocket in similar-sized wrenches (e.g., 16 mm, 17 mm, 18 mm) reduces the tooling and re-tooling costs of forming these tools. This concept is possible because the radius ratio between the pawl and gear teeth in the horizontal plane (with the pawl having a larger horizontal radius than the gear) allows one pawl and pawl pocket to work effectively with two or more similar-sized wrenches. Because the tolerances of a pawl with a horizontal radius larger than that of a gear allow for some variance in the gear's size, wrenches with similar-sized gears may be able to use identical pawl/pawl pocket arrangements. The advantage of this design is primarily a cost savings from not having to re-tool as frequently when forming pawl pockets and pawls. It should be understood, however, that pawl tolerances allow only for a certain amount of variance in the gear's size. For example, the pawl's radius in the horizontal plane (i.e., the plane normal to the page and including plane 829 in FIG. 12B) should be at least as large as the gear's radius. A pawl with a radius smaller than that of the gear would not mesh with the gear and, thus, would yield an inoperable tool. On the other end of the spectrum, if the pawl's radius in the horizontal plane is too large when compared with the gear's radius, the tool will not function properly, and the pawl pocket may not fit in the tool's neck portion. For pawl radii between these two extremes, using the same pawl and pawl pocket in different similar-sized wrenches reduces the tooling costs of forming these tools.

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit of the appended claims.

What is claimed:

1. A method of forming an enclosed pawl pocket that is integral with a neck portion of a wrench, the wrench having a handle and a head integral with the handle and defining the integral neck portion between the head and the handle, wherein the head defines a bore having an axis extending between a first side of the wrench and a second side of the wrench, and wherein the bore has an opening to at least the first side, said method comprising the steps of:

provxiding a keyway cutter having a planar cutting head disposed on an elongated pin having an axis, the plane of the cutting head being perpendicular to the pin axis, and having a radius defined in the plane of the cutting head between a center of the cutting head and the outermost edge of the cutting head being less than a radius of the bore;

disposing the keyway cutter within the bore through the opening so that the cutting head is in an operating plane that is perpendicular to the bore axis;

while maintaining the cutting head in the operating plane, moving the cutting head into the neck portion along a predetermined path so that the cutting head cuts the pawl pocket into the neck portion, the predetermined path defining at least two flat surfaces on respective opposing sides of the pawl pocket, each of the flat surfaces defining an angle in the range of about 27 to 35 degrees between a centerline of the pawl pocket and the flat surfaces.

2. The method of claim 1 wherein the pawl pocket defines an arcuate surface between the flat surfaces.

3. The method of claim 2 wherein the arcuate surface defines a single radius of curvature in the operating plane and between the flat surfaces.

4. The method of claim 3 wherein the radius of curvature is equal to the radius of the cutting head of the keyway cutter.

5. The method of claim 2 wherein the radius of the cutting head is greater than a radius of the elongated pin plus the distance between an edge of the pawl pocket and a desired depth of the pawl pocket along the centerline of the pawl pocket, thus allowing for wear of the cutter head over time.

6. The method of claim 2 wherein the length of the flat surfaces is sufficient to accommodate a loading point of a given pawl.

7. The method of claim 6 wherein the length of the flat surfaces is in the range of about 0.035 inches and 0.055 inches.

8. The method of claim 2 wherein the cutting head of the keyway cutter is circular and defines a plurality of cutting teeth extending radially outward from the pin axis.

9. The method of claim 2 wherein the step of moving the keyway cutter into the neck portion along a predetermined path further comprises the steps of:

moving the cutting head into the neck portion of the wrench on a first opposite side of the pawl pocket;

cutting the first side of the pawl pocket with at least one flat surface and at least one arcuate surface; and cutting the second side of the pawl pocket with at least one flat surface and at least one arcuate surface.

10. The method of claim 2 wherein the angle in the range of about 27 to 35 degrees is about 31 degrees.

11. A reversible ratcheting wrench with an enclosed pawl pocket that is integral with a neck portion of the wrench, the wrench having a handle and a head integral with the handle and defining the integral neck portion between the head and the handle, wherein the head defines a bore having an axis extending between a first side of the wrench and a second side of the wrench, and wherein the bore has an opening to at least the first side, said wrench prepared by a process comprising the steps of:

providing a keyway cutter having a planar cutting head disposed at the end of an elongated pin having an axis, the plane of the cutting head being perpendicular to the pin axis, and having a radius defined in the plane of the cutting head between a center of the cutting head and the outermost edge of the cutting head being less than a radius of the bore;

disposing the keyway cutter within the bore through the opening so that the cutting head is in an operating plane that is perpendicular to the bore axis;

while maintaining the cutting head in the operating plane, moving the cutting head into the neck portion along a predetermined path so that the cutting head cuts the pawl pocket into the neck portion, the predetermined path defining at least two flat surfaces on respective opposing sides of the pawl pocket, each of the flat surfaces defining an angle in the range of about 27 to 35 degrees between a centerline of the pawl pocket and the flat surfaces.

12. The wrench of claim 11 wherein the pawl pocket defines an arcuate surface between the flat surfaces.

13. The wrench of claim 12 wherein the arcuate surface defines a single radius of curvature in the operating plane and between the flat surfaces.

14. The wrench of claim 13 wherein the radius of curvature is equal to the radius of the cutting head of the keyway cutter.

15. The wrench of claim 12 wherein the radius of the cutting head is greater than a radius of the elongated pin plus the distance between an edge of the pawl pocket and a desired depth of the pawl pocket along the centerline of the pawl pocket, thus allowing for wear of the cutter head over time.

16. The wrench of claim 12 wherein the length of the flat surfaces is sufficient to accommodate a loading point of a pawl.

17. The wrench of claim 16 wherein the length of the flat surfaces is in the range of about 0.035 inches and 0.055 inches.

18. The wrench of claim 12 wherein the cutting head of the keyway cutter is circular and defines a plurality of cutting teeth extending radially outward from the pin axis.

19. The wrench of claim 12 wherein the step of moving the keyway cutter into the neck portion along a predetermined path further comprises the steps of:

moving the cutting head into the neck portion of the wrench on a first opposite side of the pawl pocket;

cutting the first side of the pawl pocket with at least one flat surface and at least one arcuate surface; and cutting the second side of the pawl pocket with at least one flat surface and at least one arcuate surface.

20. The wrench of claim 12 wherein the angle in the range of 27 to 35 degrees is 31 degrees.

21. A reversible ratcheting wrench with an enclosed pawl pocket, said wrench comprising:

a handle;

a head integral with the handle and defining an integral neck portion between the head and the handle, wherein the head defines a bore having an axis extending between a first side of the wrench and a second side of the wrench, and wherein the bore has an opening to at least the first side;

a gear rotatably disposed in the bore;

a pawl pocket in the neck portion of the wrench, the pawl pocket configured to accept a pawl; and wherein the pawl pocket has at least two flat surfaces on respective opposing sides of the pawl pocket, each of the flat surfaces defining an angle in the range of about 27 to 35 degrees between a centerline of the pawl pocket and the flat surfaces.

22. The wrench of claim 21 wherein the pawl pocket defines an arcuate surface between the flat surfaces.

23. The wrench of claim 22 wherein the arcuate surface defines a single radius of curvature in the operating plane and between the flat surfaces.

24. The wrench of claim 21 wherein the length of the flat surfaces is sufficient to accommodate a loading point of a pawl.

25. The wrench of claim 24 wherein the length of the flat surfaces is in the range of 0.035 inches and 0.055 inches.

26. The wrench of claim 21 wherein the angle in the range of about 27 to 35 degrees is about 31 degrees.

* * * * *